United States Patent
McDonnell et al.

(10) Patent No.: US 7,539,577 B2
(45) Date of Patent: May 26, 2009

(54) METHOD OF DATA ACQUISITION DURING SURVEY OF BURIED LINEAR CONDUCTORS

(75) Inventors: Shamus McDonnell, Edmonton (CA); Mike Westman, Edmonton (CA)

(73) Assignee: Spectrum External Line Inspection, Alberta (CA)

( * ) Notice: Subject to any disclaimer, the term of this patent is extended or adjusted under 35 U.S.C. 154(b) by 0 days.

(21) Appl. No.: 11/635,777

(22) Filed: Dec. 7, 2006

(65) Prior Publication Data

US 2007/0265809 A1 Nov. 15, 2007

(30) Foreign Application Priority Data

May 10, 2006 (CA) .................................. 2,548,926

(51) Int. Cl.
*G06F 17/00* (2006.01)
(52) U.S. Cl. .............................................. 702/2; 702/5
(58) Field of Classification Search ...................... 702/2, 702/5, 6, 7
See application file for complete search history.

(56) References Cited

U.S. PATENT DOCUMENTS

| | | | |
|---|---|---|---|
| 4,387,340 A | 6/1983 | Peterman | |
| 5,467,290 A * | 11/1995 | Darland et al. | 342/463 |
| 5,576,973 A | 11/1996 | Haddy | |
| 5,828,219 A | 10/1998 | Hanlon et al. | |
| 6,127,827 A | 10/2000 | Lewis | |
| 6,549,011 B2 | 4/2003 | Flatt | |
| D475,936 S | 6/2003 | Craig et al. | |
| 6,617,855 B2 | 9/2003 | Flatt et al. | |
| D488,725 S | 4/2004 | Craig et al. | |
| 6,717,392 B2 | 4/2004 | Pearson | |
| 6,777,923 B2 | 8/2004 | Pearson | |
| 6,836,231 B2 | 12/2004 | Pearson | |
| 6,954,071 B2 | 10/2005 | Flatt et al. | |
| 6,965,320 B1 | 11/2005 | Casey et al. | |
| 7,113,868 B2 * | 9/2006 | Brewster | 702/5 |
| 2003/0058108 A1 | 3/2003 | Fling et al. | |
| 2003/0058961 A1 | 3/2003 | Fling et al. | |
| 2004/0004479 A1 | 1/2004 | Flatt et al. | |

FOREIGN PATENT DOCUMENTS

GB 2108347 A * 5/1983

* cited by examiner

*Primary Examiner*—Donald E McElheny, Jr.
(74) *Attorney, Agent, or Firm*—Davis & Bujold, P.L.L.C.

(57) ABSTRACT

A method of data acquisition during survey of buried linear conductors. A first step involves passing a dynamic data stream of data from survey instruments through a filtering software adapted to reduce the volume of data being processed. A second step involves setting a survey interval within the software, the survey interval being a selected distance between survey points in order to provide a desired survey point density. A third step involves setting a geographic activation buffer within the software in relation to the survey interval. The filtering software is programmed to process data within the activation buffer separately from the dynamic data stream.

7 Claims, 2 Drawing Sheets

US 7,539,577 B2

METHOD OF DATA ACQUISITION DURING SURVEY OF BURIED LINEAR CONDUCTORS

This application claims priority from Canadian Application Serial No. 2,548,926 filed May 10, 2006.

FIELD OF THE INVENTION

The present invention relates to a method of data acquisition during survey of buried linear conductors, such as pipelines and utility lines.

BACKGROUND OF THE INVENTION

When conducting a survey of buried linear conductors, a number of instruments must be used. An electromagnetic locator is used to locate the buried linear conductor. A global positioning system (GPS) receiver or Inertial Mapping Units (IMU) is used to produce geodetic coordinates. If coatings are being evaluated, the survey may include an Alternate Current Voltage Gradient (ACVG) or Direct Current Voltage Gradient (DCVG). If depth of cover is being evaluated, the survey may include instruments to evaluate Depth of Cover (DoC). If bodies of water are being crossed, the survey may include Sonar to indicate depth of water. If Cathodic Protection on the linear conductor is being evaluated pipe to soil potentials may be included. The magnitude of the continuous data stream produced by these instruments, creates numerous processing problems.

SUMMARY OF THE INVENTION

According to the present invention there is provided a method of data acquisition during survey of buried linear conductors. A first step involves passing a dynamic data stream of data from survey instruments through a filtering software adapted to reduce the volume of data being processed. A second step involves setting a survey interval within the software, the survey interval being a selected distance between survey points in order to provide a desired survey point density. A third step involves setting a geographic activation buffer within the software in relation to the survey interval. The filtering software is programmed to process data within the activation buffer separately from the dynamic data stream.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of data acquisition during survey of buried linear conductors will now be described with reference to FIG. 1 through 4.

Figure 1:
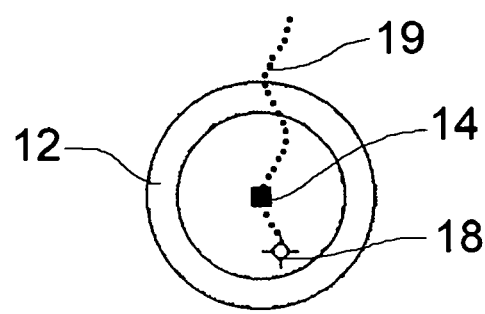
FIG. 1 is a top plan view of a first survey point having been found in accordance with the preferred method of data acquisition during survey of buried linear conductors
Figure 2:
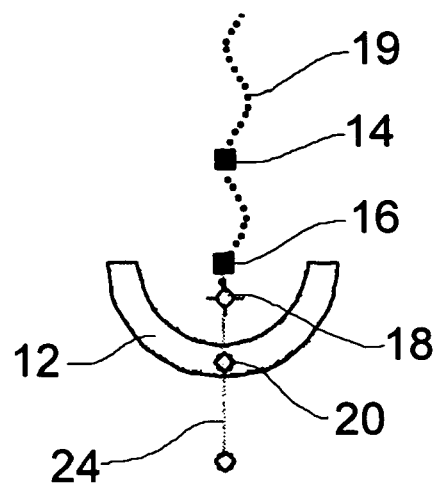
FIG. 2 is a top plan view of a second survey point having been found in accordance with the preferred method of data acquisition during survey of buried linear conductors
Figure 3:
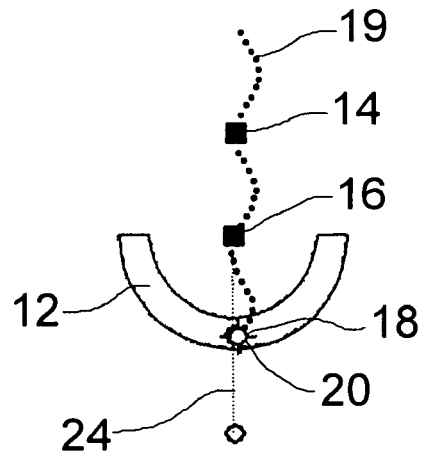
FIG. 3 is a top plan view of a third survey point being found in accordance with the preferred method of data acquisition during survey of buried linear conductors
Figure 4:
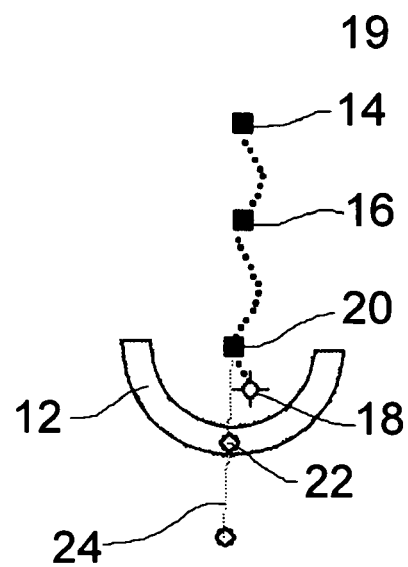
FIG. 4 is a top plan view of a fourth survey point being found in accordance with the preferred method of data acquisition during survey of buried linear conductors and FIG. 5 is a flow diagram showing the data acquisition during survey of buried linear conductors.
Figure 5:
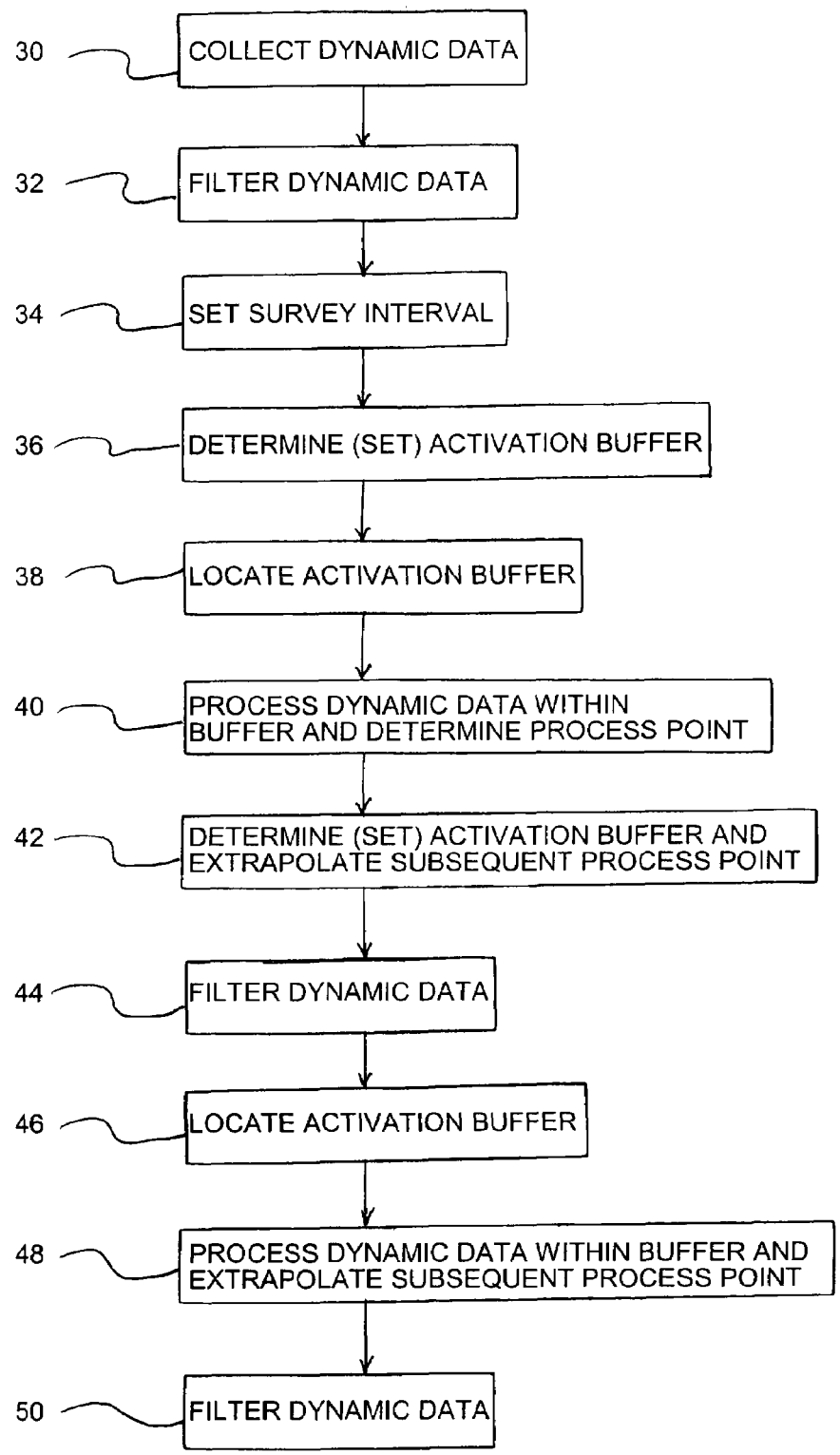

The method of data acquisition during survey of buried linear conductors begins by passing a dynamic data stream of data from survey instruments through a filtering software adapted to reduce the volume of data being processed (steps 30, 32). A survey interval is set within the software, where the survey interval is a selected distance between survey points in order to provide a desired survey point density (step 34). The survey interval is automatically adjusted by the software in accordance with pre-selected parameters, such as topographical features. This allows geodetic features such as slopes or changes in the profile of the linear conductor to be automatically surveyed and mapped at a higher resolution. Referring to FIG. 1, a geographic activation buffer 12 is also set, such as a complete circle as shown in FIG. 1 for the first point, or a concave arc, as shown in FIG. 2 through 4 for subsequent points (step 36). A complete circle is not needed for subsequent points (steps 42, 48) since the largest possible deviation in either direction will be 90 degrees. This activation buffer 12 is set within the software in relation to the survey interval. The filtering software is programmed to process data within the activation buffer separately from the dynamic data stream.

Once a first survey point 14 and a subsequent survey point 16 have been found by surveyor 18, as shown in FIG. 2, a target survey point 20 may then be extrapolated by the software from previously surveyed survey points (steps 42, 48). Referring to FIG. 1, it will be noted that there is not extrapolated survey point possible, as there is only one reference point 14 to use. Thus, buffer 12 also forms a complete circle in this situation, as the next point could be in any direction. The path taken by surveyor 18 is represented by dotted line 19. Means, such as a display providing visual feedback or a tone generator providing audio feedback or both (not shown), are provided to guide a surveyor to the target survey point (steps 38, 46), as shown in FIG. 3. Referring to FIG. 4, this process is then repeated for the next survey point 22.

Thus, the present patent document describes a software based system designed to allow controlled data acquisition and immediate processed result feedback during the survey of buried linear conductors. The method incorporates an electromagnetic pipe or cable locator carried by a surveyor 18 to detect the buried conductor, and multiple other survey instruments and a system to produce geodetic coordinates in real time during data collection (Global positioning System—GPS, Inertial Mapping Unit—IMTJ, etc.).

The system implements a targeting feature designed to "guide" the surveyor 18 to the next pre-selected survey interval along the linear conductor. The survey interval is the pre-selected minimum distance needed for desired survey point density (every 10 meters for instance) (step 34). A secondary distance is also selected for the tolerance of the survey interval to create a buffer 12 (steps 36, 42, 48) in which data will processed (steps 40, 48) and potentially logged as the survey point (+/−1 meter for instance). Data received outside this zone is not processed (steps 32, 44, 50). The geodetic coordinate system then provides coordinates to assess the surveyors 18 initial location. Referring to FIG. 2, points 14 and 16 are taken and the pre-selected survey interval and buffer 12 are projected in real time by the software, and displayed on a virtual map as a target which the surveyor 18 is guided to by visual and/or audio feedback. The bearing 24 of the target is extrapolated from the previously surveyed points 14 and 16, or, referring to FIG. 4, points 14,16 and 18, and line locator information.

Referring to FIG. 3, when the pre-set survey interval buffer 12 is reached (steps 38, 46), the survey instrumentation data is then processed in real time by the software to determine when a complete set of data readings is acquired (steps 40, 48). The quality and completeness of the survey readings is immediately relayed to the surveyor 18. The projected target 20 incorporates the buffer 12 and a 3D arc to allow detection and processing of data readings if the linear conductor makes a horizontal bend between the target and previous point.

When certain survey conditions are encountered, the targeting is automatically adjusted within the software to force densification in areas where required. This feature allows geodetic features such as slopes, or changes in the profile of the linear conductor to be automatically surveyed and mapped in higher resolution.

The "target" points 14, 16, 20 and 22 are uniquely identified in the software so that they can be processed and reported separately from the rest of the dynamic log file which has continuous data readings from all survey instruments being employed (faster and easier). This allows the surveyor 18 to be consciously directed to where "needed" points are to be recorded, and then allows processing of only those points for reporting purposes.

In summary, the described method and system works to control survey data acquisition by:

1) Processing data only when the surveyor reaches a pre-selected interval with a pre-selected buffer for tolerance (steps 40, 48).

2) Guiding the surveyor to the projected target (steps 38, 46) where electronic survey data is processed (steps 40, 48) an immediately reported to the user to confirm completeness and quality.

3) Adjusting the survey interval to optimize survey point density when abnormal conditions are encountered that warrant densification of survey readings.

4) Storing target point data separately in the logged survey data to allow easier processing and reporting after completion of the survey.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method of data acquisition during survey of buried linear conductors, comprising the steps of:
   passing a dynamic data stream of data from survey instruments through a filtering software adapted to reduce the volume of data being processed;
   setting a survey interval within the software, the survey interval being a selected distance between survey points in order to provide a desired survey point density; and
   setting a geographic activation buffer within the software in relation to the survey interval, the filtering software being programmed to process data within the activation buffer separately from the dynamic data stream.

2. The method as defined in claim 1, a target survey point being extrapolated by the software from previously surveyed survey points and means being provided to guide a surveyor to the target survey point.

3. The method as defined in claim 2, the means to guide a surveyor to the target survey point being a display providing visual feedback.

4. The method as defined in claim 2, the means to guide a surveyor to the target survey point being a tone generator providing audio feedback.

5. The method as defined in claim 1, the survey interval being automatically adjusted by the software in accordance with pre-selected parameters.

6. The method as defined in claim 5, one of the pre-selected parameters being topographical features, such that slopes are automatically surveyed at a higher resolution.

7. The method as defined in claim 1, the activation buffer being a concave arc.

\* \* \* \* \*